June 17, 1930.                A. BAUER                1,765,198
DEVICE FOR TESTING LIGHT SENSITIVE MATERIALS
Filed May 27, 1929
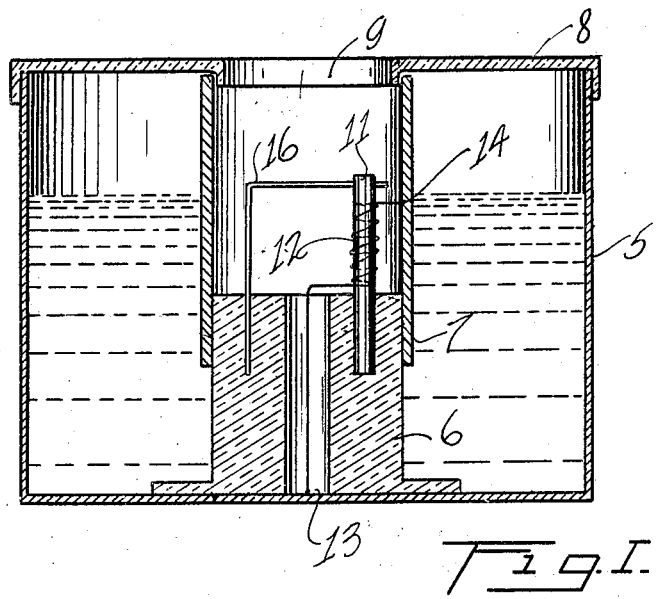
Fig. I.
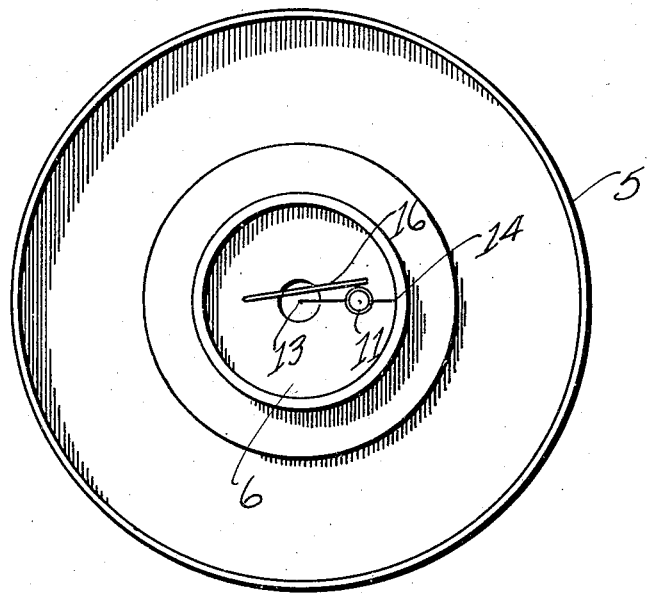
Fig. II.
INVENTOR.
ALFRED BAUER
BY
ATTORNEY.

Patented June 17, 1930

1,765,198

UNITED STATES PATENT OFFICE

ALFRED BAUER, OF WEIMAR, CALIFORNIA

DEVICE FOR TESTING LIGHT-SENSITIVE MATERIALS

Application filed May 27, 1929. Serial No. 366,465.

This invention relates to improvements in devices for testing light sensitive material.

The principal object of the present invention is to produce a device which will indicate whether or not a given substance is sensitive to light.

Another object is to produce a device of this character which is extremely simple, and therefore one which may be used by a novice.

A further object of the invention is to produce a device which is economical to manufacture and well within the purchase price of the average user.

Other objects and advantages will be apparent during the course of the following description.

In the accompanying drawing, forming a part of this specification, and in which like numerals are employed to designate like parts throughout the same, Figure I is a vertical cross section of my device, Figure II is a top plan view of the device with cover removed.

In the accompanying drawing wherein for the purpose of illustration is shown a preferred embodiment of my invention, the numeral 5 designates a receptacle made of metal so as to form a conductor for the current, as will be later seen. Secured within the receptacle 5, is an insulating block 6 which is centrally disposed therein and suitably secured thereto. This block serves to position a tubular member 7 concentric with the side walls of the receptacle 5. A cover 8 is provided, which cover is preferably made of insulating material, and has a downwardly extending light seal 9 which extends into the tubular member 7.

A rod 11 is supported in the block 6 and has a coil 12 wound thereabout. One end of the coil passes down through the center of the insulated block 6 and is connected as at 13 to the bottom of the receptacle 5. The opposite end of the coil is connected as at 14 to the member 7.

An indicator having a horizontal arm 16 has one end embedded in the insulated block 6 and has its opposite end in close proximity to the rod 11.

The result of this construction is that when it is desired to test a light sensitive material, the liquid to be tested is placed within the receptacle 5 so that it is of sufficient depth to contact the side wall of the receptacle as well as the lower portion of the member 7.

The substance to be tested, preferably a liquid which when placed within the space between the receptacle 5 and the tubular element 7 which are virtually two terminals of an electric circuit, generates current enough to cause the indicator 16 to make contact with the rod 11. The material being tested is now diluted or mixed with other substances just enough so that the indicator 16 just barely makes contact with the rod 11. The cover 8 is placed on the receptacle 5, the light excluded and if then the indicator 16 breaks contact with the rod 11, or else alters its contact with it in any way, it shows that the material being tested is sufficiently light sensitive to actuate sensitive mechanism when properly applied thereto, and be of value and that further experiments thereon should be made and data obtained.

It will thus be seen that I have produced a device which is simple and one which will perform all of the objects herein set forth.

It is to be understood that the form of my invention herewith shown and described is to be taken as a preferred example of the same and that various changes relative to the shape, size, material and arrangement of parts may be resorted to without departing from the spirit of the invention, or the scope of the subjoined claim.

Having thus described my invention, I claim:—

In a device of the character described, a receptacle, an insulating member positioned within said receptacle, a tubular element carried on said insulating member, a rod positioned within said tubular element and mounted on said insulating member, an indicator mounted on said insulating member and having one end in close proximity to said rod, a coil surrounding said rod and having one end electrically connected to said tubular member and having its opposite end connected to said receptacle, and a cover for said receptacle, said cover having an opening formed therein and with a downwardly extending flange surrounding said opening and extending into said tubular element.

In testimony whereof I affix my signature.

ALFRED BAUER.